June 7, 1960  K. G. KÅRDÉN  2,939,675
THROTTLE VALVES FOR PNEUMATIC TOOLS OR THE LIKE
Filed Jan. 3, 1955  2 Sheets-Sheet 1
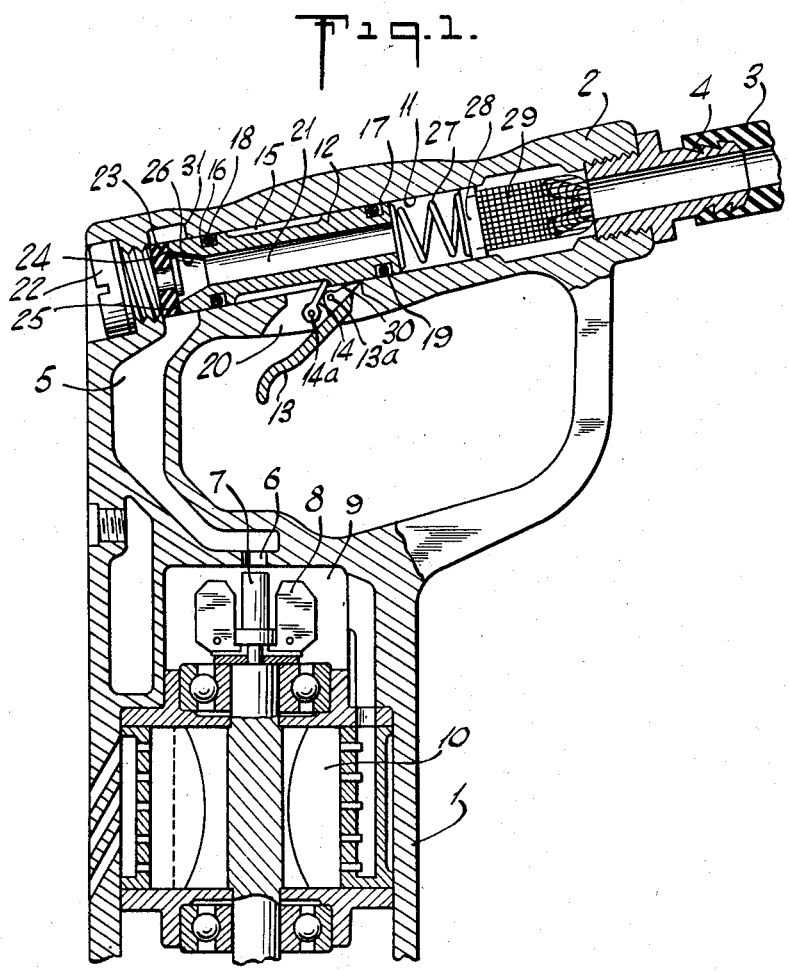
INVENTOR.
KARL GOSTA KARDEN
BY
HIS ATTORNEY

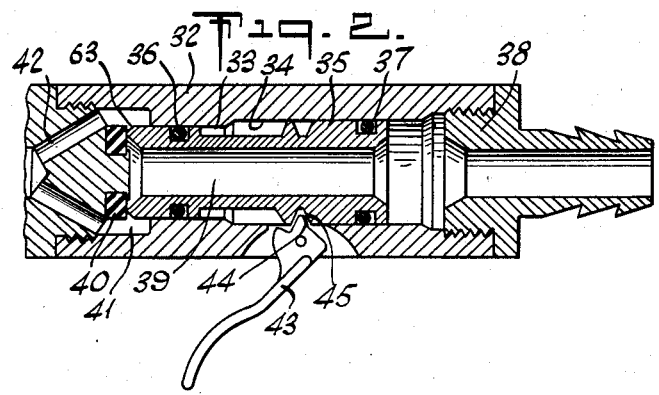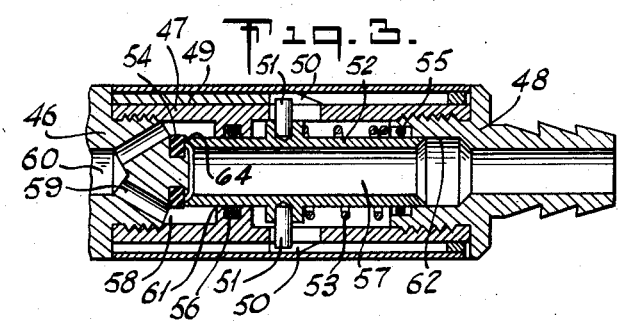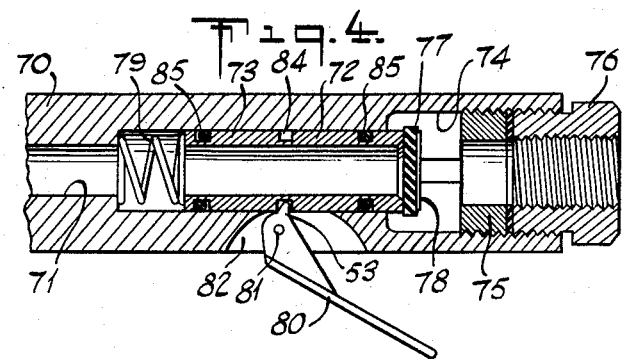

United States Patent Office 2,939,675
Patented June 7, 1960

2,939,675

THROTTLE VALVES FOR PNEUMATIC TOOLS OR THE LIKE

Karl Gösta Kårdén, Nacka, Sweden, assignor to Atlas Copco Aktiebolag, a corporation of Sweden Filed Jan. 3, 1955, Ser. No. 479,578

Claims priority, application Sweden Jan. 12, 1954

5 Claims. (Cl. 251—242)

This invention relates to throttle valves for pneumatic tools or apparatus having a tubular valve member movable by means of a trigger or other operating means. Throttle valves for pneumatic tools and other compressed air driven apparatus usually form a part of the handle portion of the tool or the like. Such valves often comprise a cylindrical piston valve member which is guided and movable with an airtight fit in the handle portion or in a sleeve provided in the handle portion. Due to the accuracy with which such valves must be carried out in order to be perfectly tight such throttle valves are usually rather expensive. Throttle valves are also well known which comprise a mushroom type valve member provided on a stem having ducts axially thereof. In such throttle valves a bending of the air flow through the valve member and stem cannot be avoided and these valves are also rather expensive in manufacture and maintenance. One object of this invention is to produce a throttle valve providing a substantially straight and unrestricted passage for the compressed air through the valve member thereby reducing the resistance to the flow of the air to a minimum. A further object is to provide a throttle valve with a large flow area for the air and small external dimensions. A still further object of the invention is to produce a throttle valve in which the valve member is movable in a bore or bores in the tool or other apparatus which may be carried out by cheap manufacturing processes with a minimum of grinding or lapping or similar expensive manufacturing processes. A further object of the invention is to provide a design in which the valve member may be manufactured from comparatively inexpensive tubular stock. Further features of the invention will be disclosed by the following specification and claims with reference to the drawings.

In the accompanying drawings four embodiments of throttle valves for pneumatic tools according to the invention are illustrated by way of example. Fig. 1 is a section through the handle and motor of a pneumatic tool. Figs. 2, 3 and 4 are sections through handle portions of pneumatic tools provided with throttle valves according to three further embodiments of the invention. The invention may be modified in various ways within the scope of the claims.

In Fig. 1 1 designates the housing of a motor of a pneumatic tool and 2 a handle portion in which a throttle valve according to the invention is disposed. Compressed air may be supplied through a hose 3 which by means of a suitable hose connection 4 is attached with screw threads at one end of the handle portion 2. Compressed air is conveyed through the throttle valve to a passage 5 in the handle and from said passage through an opening 6, the size of which is controlled by a member 7 and a centrifugal governor 8, into an admission chamber 9 from which the air is supplied to the motor 10 which may, for instance, be a rotary vane motor the design of which is not described in detail since it has nothing to do with the invention.

A cylindrical bore 11 is provided in the handle portion 2, as obvious from Fig. 1, and a tubular substantially cylindrical valve members 12 is disposed in said bore and axially movable therein by an operating means which in this case consists of a trigger 13 journalled on a pin 13a in the handle portion 2, said trigger having a finger 14 journalled on a pin 14a in the trigger which engages a recess in the valve member formed by an external annular groove 15 in the valve member 12. On each side of the groove 15 the valve member 12 has two annular grooves 16 and 17, respectively, in which annular sealing rings 18 and 19, respectively, for instance O-rings, of rubber are provided. The sealing rings 18, 19 cooperate with cylindrical surfaces of the same diameter in the bore 11 and prevent the compressed air from leaking out around the valve member through an opening 20 in the handle portion 2 in which the trigger 13 and finger 14 are disposed. The valve member 12 is provided with a straight passage 21 extending centrally and axially throughout the valve member from one end to the other. A plug 22 is secured in the handle portion 2 and carries a ring 23 of suitable packing material which forms a seat 24 for a sealing surface 25 provided on an end face of the valve member 12. The sealing surface 25 is defined by a tapering bore 26 in the valve member which merges into the passage 21. A helical spring 27 is interposed between the valve member 12 and a bushing 28 in the handle portion 2 which bushing carries a strainer 29. In closed position the valve member 12 is pressed against the seat 24 by the spring 27 and the air pressure in the supply conduit 3. When the valve is opened the valve member is lifted from its seat 24 by means of the trigger 13 and the finger 14 which engages an abutment 30 on the valve member. Compressed air then flows from the conduit 3 through the straight passage 21 and then between the sealing surface 25 and the seat 24 to an annular space 31 in the handle portion 2 which space communicates with the passage 5 and the compressed air consuming portion of the tool.

It is self-evident that the valve member 12 due to its cylindrical external contour is very simple and cheap in manufacture and it is also obvious that the bore 11 in the handle portion 12 may be carried out in a simple way. Due to the arrangement of the sealing rings 18, 19 close tolerances are not necessary on the outer surface of the valve member and the surface of the bore 11 and a large straight unrestricted passage is obtained through the valve member.

In the modification of the invention illustrated in Fig. 2 32 designates a handle portion of a compressed air tool. Said handle portion is provided with coaxial bores 33, 34 with slightly different diameters. A tubular valve member 35 having portions with corresponding diameters is movable in the bores 33, 34 and provided with sealing rings 36, 37. A hose connection 38 is secured in one end of the handle portion 32. An axial duct 39 extends straight through the valve member 35 from one end to the other. At one end face the valve member is provided with a sealing surface 63 of annular shape which cooperates with a packing 40 forming a valve seat. From a chamber 41 passages 42 lead to the working chamber (not illustrated) of the tool. The valve member is operated by means of a trigger 43 journalled in the handle portion 32 and provided with teeth 44 engaging an annular flange and an annular recess 45 on the valve member. The annular space between the reduced portion of the valve member and the walls of the bores 33, 34 communicates with the atmosphere through the trigger opening. The air pressure on the big end of the valve member urges the valve member in closing direction.

Fig. 3 illustrates a further modification of the invention. On a handle portion 46 of a tool or the like a sleeve 47 is secured by screw threads at one end of the sleeve, which carries a hose connection 48 at the opposite end. A two-piece operating sleeve 49 is mounted to turn on the sleeve 47. The sleeve 49 has helical recesses or grooves 50 which cooperate with pins 51 fitted in lugs on a tubular valve member 52. The pins 51 are guided by straight axial grooves provided in the sleeve 47. A spring 53 forces the valve member 52 against a seat formed on a packing 54 carried by the plug shaped end of the handle portion 46. The sealing surface on the end face of the valve member 52 is designated by 64. O-rings 55 and 56 are provided in grooves in the hose connection 48 and the sleeve 47 and cooperate with the external cylindrical surfaces of the valve member 52. The valve member is provided with an axial passage 57 which extends straight through the valve member from one end to the other. From a space 58 passages 59, 60 lead to the working chamber of the tool or the like.

Turning of the sleeve 49 in one direction causes the valve member 52 to be displaced in the bores 61, 62 from the seat on the packing ring 54. The embodiment of the invention illustrated in Fig. 3 is particularly adapted for tools having a smooth and straight handle portion.

In the embodiment of Fig. 4 the handle portion 70 has a bore 71 communicating with the air consuming device of a tool and a bore 72 for a tubular valve member 73 as well as a bore 74 for a plug 75 and a hose connection plug 76. The plug 75 carries a valve seat of rubber 77 which is vulcanized to a head 78 carried by the plug 75. A spring 79 urges the valve member towards the seat and a trigger 80 journalled on a pin 81 in the opening 82 has a finger 83 cooperating with an annular groove 84 to move the valve member in the direction of the air flow to open it against the pressure of the spring 79. O-rings 85 form seals with the wall of the bore 72 preventing air from leaking out through the opening 82. It should be observed that the throttle valve of Fig. 4 is substantially only an inversion of the throttle valve of Fig. 1 in so far as it opens in opposite direction with regard to the direction of the air flow.

The throttle valves above described and illustrated in the drawings should only be considered as examples and may be modified in several different ways within the scope of the claims. The valve of Fig. 3 may, for instance, be operated by a trigger similar to the trigger 43 of Fig. 2 and the lugs and pins 51 may in each case be replaced by an annular flange similar to the arrangement in Fig. 2 welded to an otherwise straight and smooth piece of tube. Throttle valves according to the invention may naturally be employed in any pneumatic tool or apparatus in which it may be built in a suitable manner. The throttle valve according to the invention may be used in rotating tools as well as in hammer tools and other compressed air driven apparatus.

What I claim is:

1. In a pneumatic tool or apparatus having an elongated handle portion, a valve structure comprising a bore extending longitudinally through said handle portion and adapted to communicate with a compressed air supply conduit at one end and with a compressed air consuming device in the tool or apparatus at the opposite end, a circumferentially continuous tubular valve member having a straight unrestricted passage for compressed air extending from one end to the other internally of said valve member and freely movable in the bore from closed to open position and vice versa, an operating member for said valve member in said handle portion engaging the outside of the valve member, a valve seat in the handle portion at one end of the bore, a sealing surface on an end face of the valve member formed for cooperation with said valve seat, and O-ring packings around the valve member sealing between the valve member and the bore of the handle portion at each side of the point of engagement of said operating member and the valve member.

2. A valve structure according to claim 1, in which annular grooves are provided in the external envelope surface of the valve member for accommodating the O-ring packings.

3. A valve structure according to claim 1, in which the valve member is flared internally towards the end cooperating with the valve seat.

4. In a pneumatic tool or apparatus having an elongated handle member, a valve structure comprising a bore extending longitudinally through said handle member and adapted to communicate with a compressed air supply conduit at one end and with a compressed air consuming device in the tool or apparatus at the opposite end, a circumferentially continuous tubular valve member having a straight unrestricted passage for compressed air extending from one end to the other internally of said valve member and freely movable in the bore from closed to open position and vice versa, an operating member for said valve member in said handle member engaging the outside of the valve member, valve means comprising a sealing surface carried by said handle member at one end of said bore and a cooperating sealing surface carried by said valve member at one end thereof and located to abut said first-mentioned surface when said valve member is in said closed position, one of said sealing surfaces being elastic, said valve member having longitudinally spaced circumferential grooves in the external cylindrical surface thereof, one of said grooves being located on each side of the point of engagement of said operating member with said valve member, and O-ring packings located in each of said grooves for providing fluid tight seals between said valve member and the wall of said bore at either side of said point of engagement.

5. A valve structure according to claim 4, in which said elastic sealing surface constitutes the valve seat carried by said handle member.

References Cited in the file of this patent

UNITED STATES PATENTS

| 1,755,536 | Chase | Apr. 22, 1930 |
| 2,233,163 | Fosnot | Feb. 25, 1941 |
| 2,357,385 | DePaepe | Sept. 5, 1944 |
| 2,369,356 | Koehn | Feb. 13, 1945 |
| 2,534,183 | Shaff | Dec. 12, 1950 |
| 2,568,520 | Smith | Sept. 18, 1951 |
| 2,688,340 | Stehlin | Sept. 7, 1954 |

FOREIGN PATENTS

| 13,870 | Great Britain | Apr. 28, 1900 |